(No Model.)

D. W. CURTIS.
BUTTER WORKER.

No. 456,248. Patented July 21, 1891.

Witnesses:
James F. Duhamel
Horace A. Dodge

Inventor:
D. W. Curtis,
by Dodge & Sons
Attys

UNITED STATES PATENT OFFICE.

DAVID W. CURTIS, OF FORT ATKINSON, WISCONSIN.

BUTTER-WORKER.

SPECIFICATION forming part of Letters Patent No. 456,248, dated July 21, 1891.

Application filed April 19, 1890. Serial No. 348,598. (No model.)

*To all whom it may concern:*

Be it known that I, DAVID W. CURTIS, a citizen of the United States, residing at Fort Atkinson, in the county of Jefferson and State of Wisconsin, have invented certain new and useful Improvements in Butter-Workers, of which the following is a specification.

This invention relates to butter-workers of that class designed to be operated by power; and the invention consists in certain improvements hereinafter more fully described and claimed.

Figure 1:
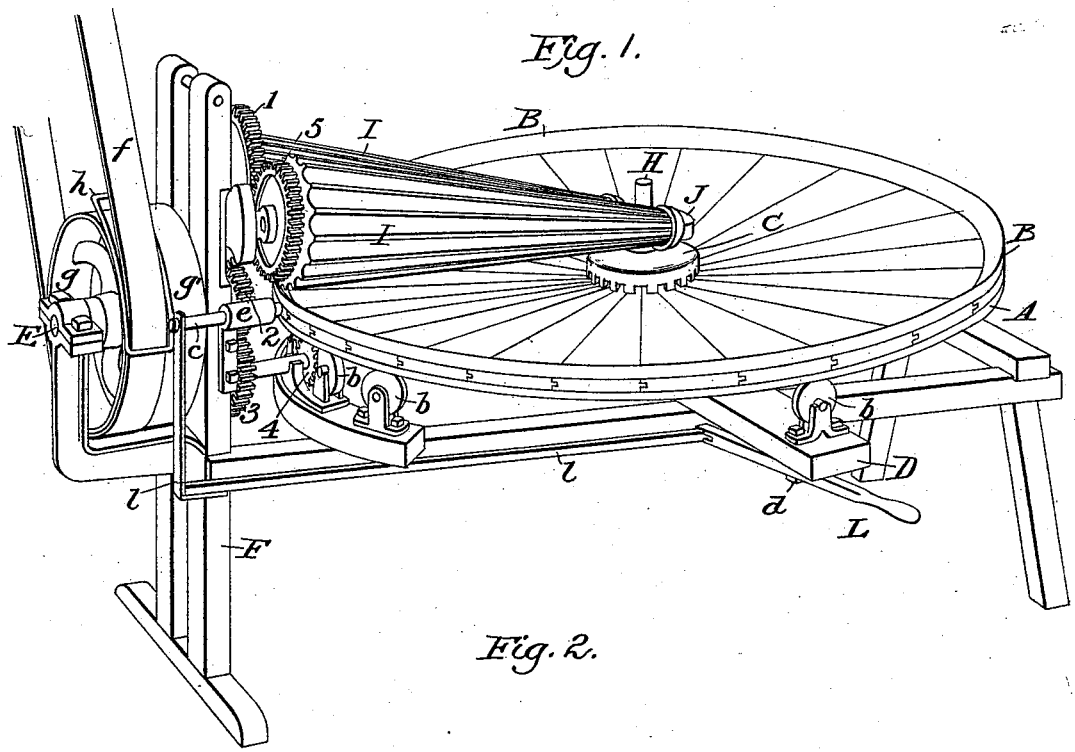
Figure 2:
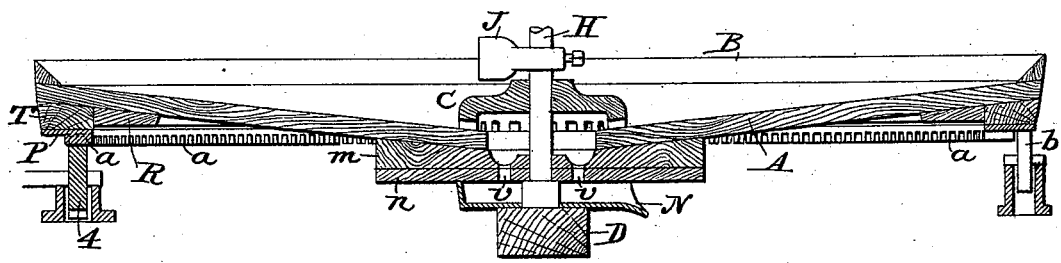
Figure 3:
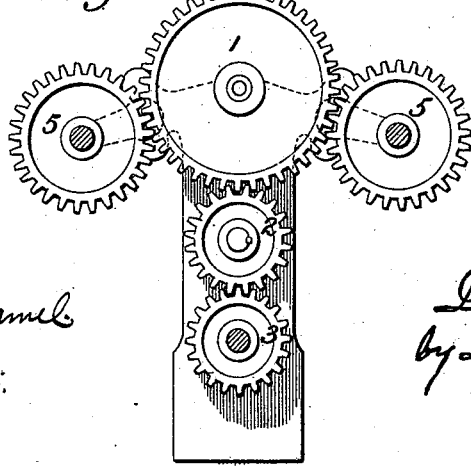

Figure 1 is a perspective view of the apparatus complete ready for use. Fig. 2 is a transverse vertical section through the center, and Fig. 3 is a face elevation of the operating-gearing.

This improvement has reference to that class of butter-workers which consist of a rotating table on which the butter is placed, with corrugated or ribbed rollers for working the butter as the table rotates.

My first improvement consists in constructing the table A of a series of V-shaped sections of wood, united along their edges by tongues and grooves or a similar joint, so shaped and put together as to make the table incline from the periphery to the center, as shown in Figs. 1 and 2, and in securing these sections or pieces to a central disk or support composed of the two layers or thicknesses of wood *m* and *n*, the grain of the wood in one being arranged at right angles to that of the other, and in securing the sections at their outer ends to two wooden supporting-rings R and T, as shown in Fig. 2, these parts being connected, when put together, so as to form a strong compact table that will retain its shape and not warp or get out of true. It is further strengthened by securing to its under side near the outer edge a metallic ring P, the outer portion of which is provided with a flat face to bear upon the supporting-rollers *b*, as shown more clearly at the right-hand side of Fig. 2, and adjoining that with a series of teeth or cogs *a* to engage with the driving-pinion, as hereinafter explained. Heretofore this style of table has been made without any projection or rim on its upper surface, and the result was that the butter would work off over the edge more or less. I make my improved table with a ledge or rim B around its edge, as shown in Figs. 1 and 2. This "rim" or "guard," as it is termed, is made of wood, about two inches in width at its base and about the same in height, and has its inner face beveled or inclined, as shown. At the center of the table a cavity or recess is formed, as shown in Fig. 2, and in the bottom of this recess I make an annular groove or channel, from which two or more holes V extend through the bottom to permit the buttermilk to drain out into a pan or spout N, secured to the frame underneath, from which it runs into a bucket placed to receive it. In order to keep the butter from working into the central recess, I provide a wooden cap C, somewhat larger in diameter than the cavity or recess, and which has a hole at its center, so that it can be slipped on over the central stud or pin H, which thus holds it in place. This cap, as shown in Fig. 2, is formed with a depending flange, in which is cut a series of small notches all around through which the buttermilk may run or drain into the central cavity. The table thus constructed is mounted upon a suitable frame F, which has a central crossbar D, in or to which is secured the stud or pin H, as represented in Fig. 2, this stud forming the central pivot or journal for the rotating table A and being provided with a shoulder upon which the central disk of the table bears and is thereby supported, its outer edge being supported upon the series of rollers *b*, mounted on the frame at suitable points, as shown in Figs. 1 and 2, so that the table has a firm support both at its center and at or near its outer edge. This central stud H projects above the table far enough to support the adjustable block J, which supports the inner ends of the rolls I I, and which can be raised or lowered to adjust the rolls, as may be necessary.

Two fluted or ribbed rolls I I are mounted over the table, as shown in Fig. 1, in such position that their outer ends will come just inside of the rim or guard B.

The gearing by which motion is imparted to the table and rolls is the same as has before been used, and hence needs but a brief description. In the plan, Fig. 3, the wheel 2 is the main driving-wheel secured to the inner end of the main shaft E, Fig. 1, on which shaft is mounted a fast and a loose pulley $g$ and $g'$, on which travels a belt $f$, driven by a prime motor. (Not shown.) The wheel 2 drives a wheel 3, secured to a short shaft, which carries at its opposite end a wheel or pinion 4, that engages with the teeth $a$ of the circular rack underneath the table, whereby the table is rotated. This driving-wheel 2 also engages with a wheel 1, located directly over it, and this wheel 1 engages on its opposite sides with the wheels 5, one of which is secured to the journal of the respective rolls, so that they are also rotated. In the machines as built a guard-plate is placed between the gearing and the rolls and table for the purpose of preventing the butter from being injured by dirt, oil, or specks from the gearing and shafts, but which is not shown in the drawings, as it forms no part of the present invention.

In using these machines an attendant is required, and as they were formerly constructed the attendant had to use one or both hands to shift the belt in order to stop or start it. In practice it is found that specks of one kind and another will occasionally get into the butter in spite of all the care possible, and not unfrequently while the attendant is using his hand to shift the belt in order to stop the machine these specks will become embedded in the butter and thus be lost to sight. In order to enable the attendant to have the free use of both hands and at the same time be able to stop the machine as occasion may require, I apply a belt-shifter in such a manner that the attendant can operate it by the pressure of his leg or body. This I accomplish by connecting the belt-shifter $h$ by a rod or bar $l$ to the inner end of a lever L, which is pivoted at $d$ to the under side of the cross-bar D, as shown clearly in Fig. 1, the belt-shifter being held in position by a guide-pin $c$, which slides to and fro in guide or bearing $e$, secured to the upright part of the frame, as shown.

It is obvious that the connection of the belt-shifter $h$ with the operating-lever L may be varied from the manner or arrangement shown, it only being necessary that the parts be so arranged that the operator can shift the belt by the pressure of his leg or body without having to use his hand or hands for that purpose, and thus leave his hands free to manipulate and care for the butter.

By these several improvements I am enabled to produce a very superior machine, one that is more durable and less liable to get out of order and that is better adapted to the wants of the trade.

I am aware that butter-workers have before been made with rotating tables and rolls, that the tables have had a vertical curb composed of staves bound with hoops, and that they have been provided with caps or guards of various kinds at the center; also, that a butter-worker having a reciprocating roller has been provided with a clutch and foot-lever for disconnecting the same; and also, that a butter-worker having a reciprocating bed has been provided with means for automatically shifting the belt in order to reverse the movement of the bed, and therefore I do not claim any of these; but What I do claim is—

1. A table for a rotary butter-worker, composed of a series of V-shaped sections united at their edges, their inner ends being secured to and supported by a central wooden disk, with their outer ends secured to an annular wooden ring, and having the metallic ring P secured thereto, substantially as shown and described.

2. In a butter-worker, the circular concave table A, having the beveled-faced rim or guard B secured upon its face at its periphery, substantially as shown and described.

3. The combination, in a butter-worker, of a frame provided with a central stationary stud H, a concave rotary table provided with a central hole to fit on said stud and having a recess with an annular groove in its bottom, with drip-holes $v$ formed therein, a cap having a central hole to fit on said stud, a notched flange to rest upon the table outside of the recess, and the adjustable support J, mounted on said stud with one or more rollers having bearings at their inner end in said support and at their outer end in boxes secured to the frame outside of the table, all arranged to operate substantially as shown and described.

In witnesss whereof I hereunto set my hand in the presence of two witnesses.

DAVID W. CURTIS.

Witnesses:
HARRY H. CURTIS,
O. B. CORNISH.